(12) United States Patent
Winkel et al.

(10) Patent No.: US 11,567,187 B2
(45) Date of Patent: Jan. 31, 2023

(54) RADAR SENSOR

(71) Applicant: indurad GmbH, Aachen (DE)

(72) Inventors: Reik Winkel, Aachen (DE); Florian Hillen, Aachen (DE)

(73) Assignee: indurad GmbH, Aachen (DE)

( * ) Notice: Subject to any disclaimer, the term of this patent is extended or adjusted under 35 U.S.C. 154(b) by 291 days.

(21) Appl. No.: 16/684,311

(22) Filed: Nov. 14, 2019

(65) Prior Publication Data

US 2020/0158818 A1 May 21, 2020

(30) Foreign Application Priority Data

Nov. 15, 2018 (DE) .......................... 202018106489.4

(51) Int. Cl.
*G01S 13/88* (2006.01)
*G01S 7/03* (2006.01)
*G01S 7/02* (2006.01)

(52) U.S. Cl.
CPC ................ *G01S 13/88* (2013.01); *G01S 7/03* (2013.01); *G01S 7/027* (2021.05)

(58) Field of Classification Search
CPC . G01S 13/88; G01S 7/03; G01S 7/027; G01S 13/00; G01S 13/89; G01S 13/426; H01Q 1/42; H01Q 3/02; H01Q 3/16–3/20
See application file for complete search history.

(56) References Cited

U.S. PATENT DOCUMENTS

| 6,556,174 | B1 * | 4/2003 | Hamman ................. H01Q 3/20 343/754 |
| 2004/0217908 | A1 * | 11/2004 | Zigler .................... H01Q 19/13 343/757 |
| 2010/0026607 | A1 * | 2/2010 | Imai ......................... G01S 7/03 343/753 |
| 2019/0064338 | A1 * | 2/2019 | Holt ...................... G01S 13/426 |

FOREIGN PATENT DOCUMENTS

| DE | 19956262 A1 | 12/2000 | |
| DE | 10002956 A1 | 7/2001 | |
| DE | 202012102598 U1 | 7/2012 | |
| WO | WO-2017089184 A1 * | 6/2017 | ............. G01S 13/89 |

* cited by examiner

*Primary Examiner* — Bernarr E Gregory
*Assistant Examiner* — Yonghong Li
(74) *Attorney, Agent, or Firm* — Dinsmore & Shohl LLP

(57) ABSTRACT

A radar sensor having a frame, a housing arranged at the frame, a transmission and reception unit for high frequency signals arranged within the housing, wherein a radiation direction of the high frequency signals irradiated by the transmission and reception unit is rotatable about an axis of rotation. The radiation direction of the high frequency signals irradiated by the transmission and reception unit is substantially orthogonally oriented toward the axis of rotation, and the housing is supported at the frame rotatably about a pivot axis.

7 Claims, 5 Drawing Sheets

RADAR SENSOR

CROSS-REFERENCE TO RELATED APPLICATION

This application claims priority from German Application No. DE202018106489.4 filed Nov. 15, 2018, the entire content of which is incorporated herein by reference.

FIELD OF THE INVENTION

The present invention relates to a radar sensor comprising a frame, a housing arranged at the frame, a transmission and reception unit for high frequency signals arranged within the housing, wherein the radiation direction of the high frequency signals irradiated by the transmission and reception unit is rotatable about an axis of rotation, and wherein the radiation direction of the high frequency signals irradiated by the transmission and reception unit is substantially orthogonally oriented toward the axis of rotation.

BACKGROUND OF THE INVENTION

Radar sensors are apparatus known from the prior art for high frequency assisted location and distance measurement on the basis of electromagnetic waves in the high frequency range, in particular at 5-500 GHz. For this purpose, radar sensors comprise a high frequency transmitter for irradiating so-called primary signals and a receiver for high frequency signals that detects the echoes reflected by spaced apart objects as so-called secondary signals. The receiver and the transmitter are here frequently configured as a combined transmission and reception unit. Depending on the radar method, the primary signals are signal pulses or a continuous wave signal that is optionally frequency modulated. Time-resolved information on the relative location, i.e. distance and viewing angle, with respect to the objects reflecting the primary signals can in particular be determined from the reflected secondary signals.

Radar sensors are today used for process monitoring and process control in a plurality of industrial applications, for example in heavy industry, in particular in mining, in agriculture, or in the handling of goods at ports and logistics centers. In comparison with competing processes based on laser signals or ultrasound signals, radar technology is in particular suitable for field deployment under rough conditions since the longwave high frequency signals used only insignificantly interact with potentially interfering objects such as grains of dust or raindrops.

Radar sensors typically comprise a housing, in which the sensitive electronic components, in particular the transmission and reception unit, are arranged in a protected manner, and a frame supporting the housing.

A radar sensor known from the prior art for monitoring a field of view measuring up to 360° works on the basis of primary signals whose radiation direction rotates about a fixed axis of rotation, wherein a field of view to be monitored is swept over by 360° during a full revolution. The irradiation of the primary signals here typically takes place radially to the axis of rotation. With respect to the axis of rotation as the vertical direction, the irradiated primary signal therefore sweeps over a horizontal angle of up to 360° with an unchangeable zenith angle of 90°. In practice, the finite beam divergence of the primary signal results in a beam expansion as the distance from the transmitter increases, whereby the spatial resolution and angular resolution of the radar measurement are impaired.

The limited solid angle of the monitored field of view that makes the use of a plurality of differently positioned radar sensors necessary is a disadvantage with such radar sensors of the prior art.

SUMMARY OF THE INVENTION

It is therefore the object of the present invention to propose a further development of a radar sensor that is characterized by a significantly larger solid angle of the monitored field of view in comparison with radar sensors in accordance with the prior art.

The invention includes the technical teaching that the housing of the radar sensor accommodating the transmitter is supported rotatably about a pivot axis at the frame.

The invention comprises increasing the solid angle that can be scanned by the primary signal of the radar sensor in that the housing, and thus also the transmitter, is pivotably supported, whereby the axis of rotation about which the radiation direction of the primary signal rotates, and thus the field of view monitored by the radar sensor, can be tilted. On an incremental tilting of the axis of rotation with respect to the starting position and on a (periodic) 360° rotation of the radiation direction of the primary signal about the axis of rotation, a large solid angle can thus be scanned by the primary signal.

In an embodiment, the radar sensor in accordance with the invention comprises a drive unit for rotating the housing about the pivot axis, with the drive unit being arranged within the housing. The use of a drive unit for actuating the pivot axis provides the advantage over a manual adjustment of an automation capability; a dynamic variation of the field of view monitored by the radar sensor can thus in particular be carried out. The integration of the drive unit in the interior of the housing on the one hand serves the creation of a compact construction that is in particular suitable for use under rough environmental conditions. It is furthermore made possible by the arrangement of the drive unit within the housing to transpose the center of mass of the pivotable part of the radar sensor as closely as possible to the pivot axis so that the radar sensor has a smaller susceptibility to interference in vibration-loaded applications.

In a further embodiment, the pivot axis in accordance with the invention is arranged orthogonally to the axis of rotation about which the radiation direction of the primary signal rotates. In this arrangement, the field of view of the radar sensor can be expanded to a full solid angle of 4 π.

The housing may be rotatable about an angular angle of ±70° about the pivot axis by means of the drive unit. An angular range that experience has shown is sufficiently large for industrial practice can thus be monitored by the radar sensor. The drive unit comprises a motor, a transmission, and an output shaft arranged along the pivot axis. The motor can in this respect in particular be configured as a brushless DC motor that represents a motor type preferably used in the field of automation engineering. The transmission of the drive unit is preferably configured with a toothed belt and/or with gear wheels.

In a further embodiment, a connector part is arranged at the frame, with the radar sensor being connected to an external supply line and/or to an external data line by means of the connector part. The connection of external feed lines in this case therefore takes place exclusively at the static part of the radar sensor, but not at the housing subject to a pivot movement, whereby the durability of the connection is increased.

In the aforesaid embodiment with a connector part for external feed lines fixed to the frame, the radar sensor may comprise at least one connection cable, with the external supply line and/or the external data line being conducted from the connector part at the frame into the interior of the housing by means of the connection cable, and with the connection cable being arranged along the pivot axis on the transition from the frame into the interior of the housing. A robust connection of the housing interior that is less susceptible to interference can be ensured in this manner. A hollow shaft is, for example, arranged along the pivot axis at the transition from the frame to the housing to receive the connection cable along the pivot axis. The connection cable is preferably configured as a buffer spring, with the buffer spring being wound about the pivot axis in the interior of the housing. A permanent and interruption-free signal transmission independently of the pivot movement of the housing is ensured by the use of a buffer spring.

Alternatively to the leading through of a data line into the interior of the housing by means of a buffer spring, the radar sensor in accordance with the invention can comprise an apparatus for optical directional high frequency communication, with a data transmission path being set up between the connector part at the frame and the interior of the housing by means of the apparatus for optical directional high frequency communication.

In a further embodiment, the housing has a first end face and a second end face, with the pivot axis extending orthogonally through the first end face and orthogonally through the second end face and with the housing being rotatably supported at the frame at the first end face and at the second end face, in each case about the pivot axis. The durability, stability and susceptibility to vibration of the radar sensor are optimized by such a support of the housing at both sides.

The radar sensor in accordance with the invention may comprise a deflection apparatus for high frequency signals arranged within the housing, with the deflection apparatus being rotatable about the axis of rotation and with the deflection apparatus for the deflection of the high frequency signals irradiated from the transmission and reception unit being configured such that the high frequency signals can be irradiated substantially orthogonally to the axis of rotation and the radiation direction of the high frequency signals is rotatable about the axis of rotation and such that high frequency signals reflected outside the radar sensor can be deflected onto the transmission and reception unit by means of the deflection apparatus. A very compact design of the radar sensor results from this that is less susceptible to interference since the transmission and reception unit is arranged as immovable within the housing and the rotation of the radiation direction of the primary signals about the axis of rotation is implemented solely by the rotation of the deflection apparatus.

The deflection apparatus may comprise a mirror, with the mirror having a plastic body that is manufactured by means of additive production and that has a reflective metal coating. In comparison with a mirror manufactured completely from metal, a mirror having a plastic body has a lower weight, whereby higher rotational frequencies of the deflection apparatus can be implemented, typically approximately 100 Hz instead of 50 Hz with purely metal mirrors. A faster scanning of the field of view of the radar sensor is thereby made possible, whereby the increase in size of the field of view in accordance with the invention is not necessarily accompanied by a corresponding increase in the measurement time.

In a further embodiment, the deflection apparatus comprises a drive for rotating the mirror, with the drive being arranged between the mirror and the transmission and reception unit about the axis of rotation and with a waveguide for high frequency signals extending through the drive. On an arrangement of the drive of the deflection apparatus about the axis of rotation, a transmission can be dispensed with and a robust construction of the deflection apparatus results that is less susceptible to vibrations. A free passage of the primary and secondary high frequency signals between the transmission and reception unit and the mirror of the deflection apparatus is ensured here by the waveguide extending in the interior of the drive.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 1:
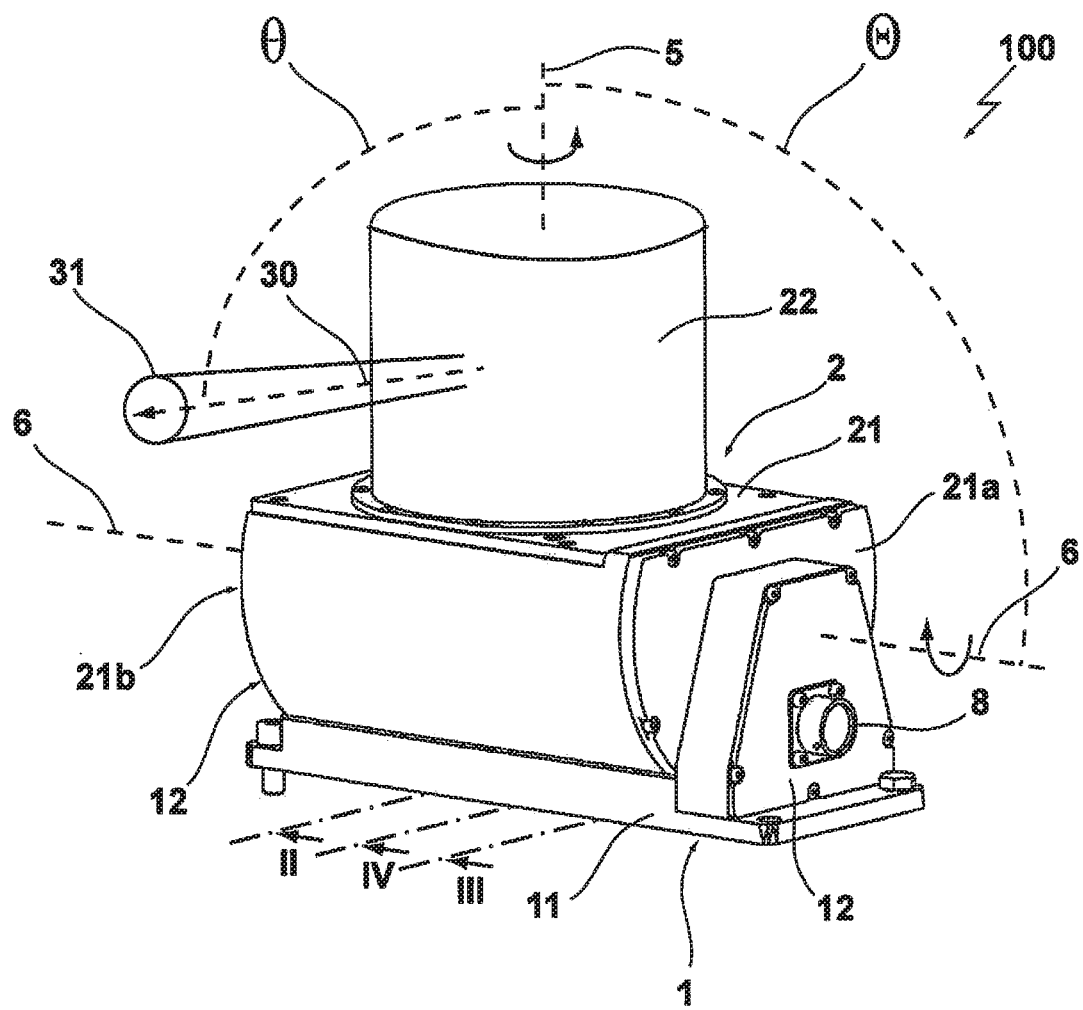
FIG. 1 is a schematic representation of an embodiment of the radar sensor in accordance with the invention.

FIG. 1 shows a schematic representation of an embodiment of the radar sensor 100 in accordance with the invention from which in particular the positional relationships between the radiation direction 30 of the primary signal 31, the axis of rotation 5, and the pivot axis 6 in accordance with the invention can be seen. Both the angle θ between the axis of rotation 5 and the radiation direction 30 and the angle Θ between the axis of rotation 5 and the pivot axis 6 amount to 90° here. On a rotation of the radiation direction 30 about the axis of rotation 5, the angle θ remains constant so that on a rotation of the radiation direction 30 about 360° a plane is swept over by the primary signal 31 whose vertical corresponds to the axis of rotation 5. With radar sensors in accordance with the prior art, the monitored field of view is restricted to this plane. A certain increase in size of the field of view of the sensor admittedly results from the finite beam divergence of the primary signal 31 in practice, but this is at the cost of the spatial resolution and angular resolution of the measurement. The introduction of the pivot axis 6 in accordance with the invention enables a tilting of the axis of rotation 5, with the angles Θ and θ amounting to a constant 90° in the embodiment shown, from which a corresponding tilt of the field of view of the radar sensor 100 results. The pivot range of the pivot axis 6 preferably amounts to up to ±70° so that practically every spatial point can be monitored by the radar sensor 100.

In the embodiment shown, the frame 1 comprises a frame base 11 and two holders 12 that are each arranged at the end faces 21a and 21b of the housing body 21. In the perspective selected in FIG. 1, the end face 21b and the second holder 12 arranged thereat are covered by the housing body 21. Bearings by means of which the housing body 21 is received in the frame 1 rotatably about the pivot axis 6 are present at the holders 12. The housing 2 furthermore comprises the hood 22 that is produced from a material permeable for high frequency signals. The rotation of the radiation direction 30 of the primary signals 31 may be implemented by means of a rotating deflection apparatus arranged within the housing (see description of FIG. 2). The connector part 8 serves to connect the radar sensor 100 to external supply and/or data lines. The connector part 8 is arranged at the immovable holder 12 and thus does not participate in the rotation about the pivot axis 6, whereby the robustness and the durability of the connection to the external feed lines is ensured. The further connection of the connector part 8 to the interior of the housing is preferably implemented by means of a buffer spring as the connection cable (see description of FIG. 4), with the connection cable extending along the pivot axis 6 at the transition from the holder 12 into the interior of the housing body 21.

Figure 2:
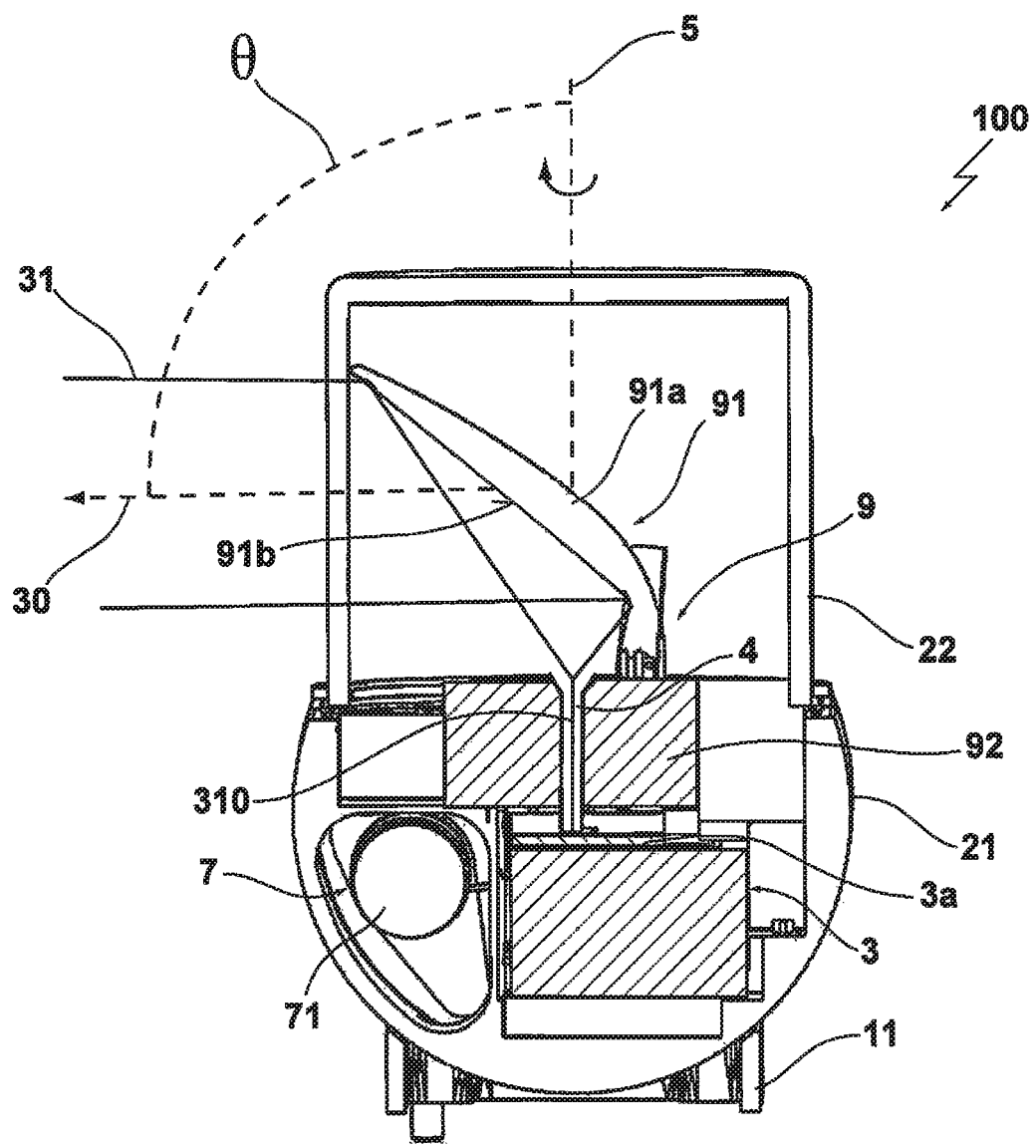
FIG. 2 is a first sectional representation of the embodiment.
Figure 3:
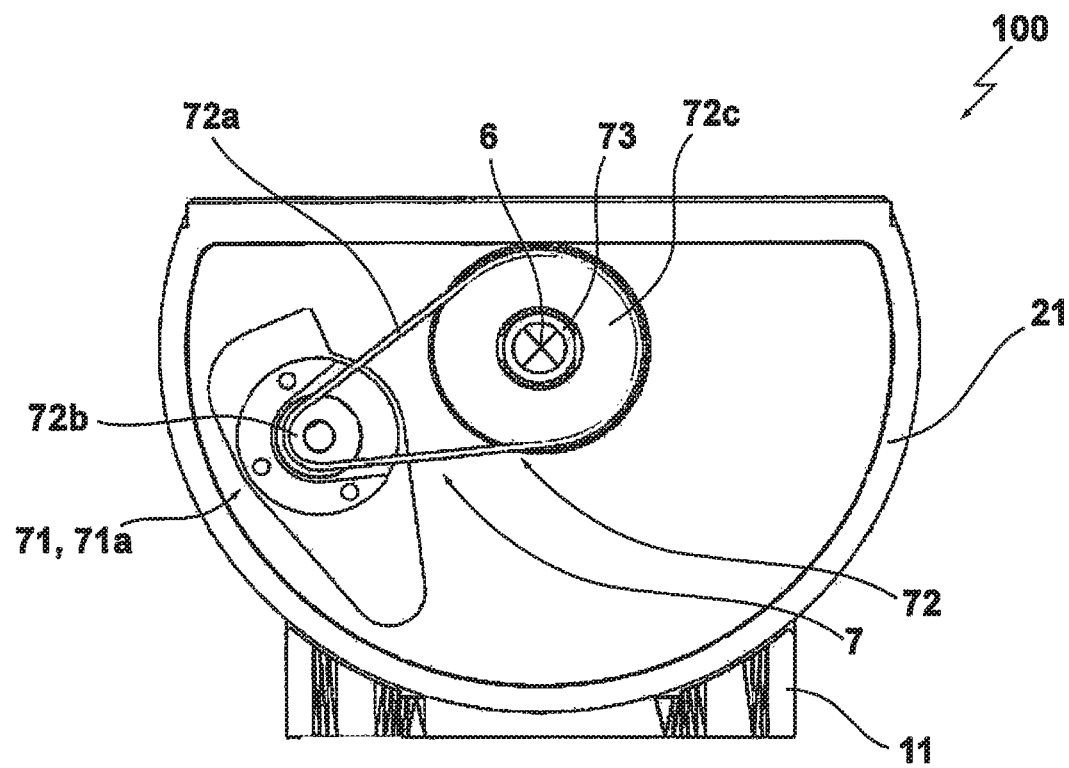
FIG. 3 is a second sectional representation of the embodiment.
Figure 4:
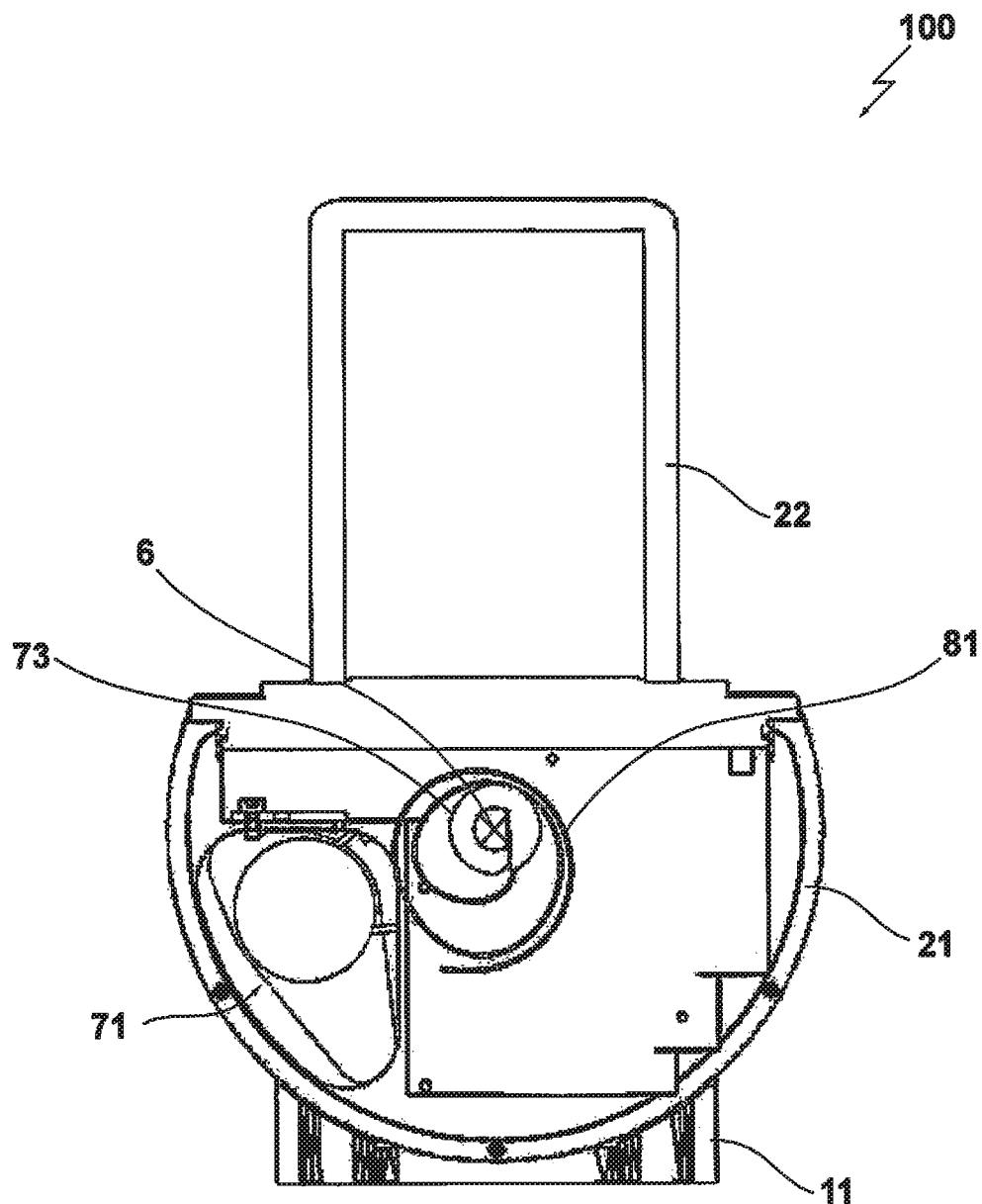
FIG. 4 is a third sectional representation of the embodiment.

II, III, and IV mark the sectional planes through the radar sensor 100 in accordance with the invention shown in FIGS. 2 to 4, with the sectional planes each being oriented orthogonally to the pivot axis 6.

FIG. 2 shows a first sectional representation of the radar sensor 100 shown in FIG. 1, with the sectional plane being oriented orthogonally to the pivot axis 6 and extending along the marking II shown in FIG. 1 and including the axis of rotation 5. In particular the generation of the primary signal 31 is shown here. The transmission and reception apparatus 3 emits high frequency signals 310 from the front end 3a that propagate through the waveguide 4 along the axis of rotation 5 and that are deflected at a right angle in the further extent by the mirror 91 of the deflection apparatus 9 rotating about the axis of rotation 5 so that the primary signal 31 exiting the hood 22 extends along the radiation direction 30, with the finite beam divergence resulting in a beam expansion. The waveguide 4 here extends in the interior of the drive 92 of the deflection apparatus 9, said drive 92 being arranged about the axis of rotation 5. The waveguide 4 can be filled with a dielectric medium and the cross-section of the waveguide 4 is expanded to form a horn antenna in the region of the radiation exit. The deflection apparatus 9 also serves in the reverse direction for the deflection and focusing of the secondary signals reflected back onto the radar sensor 100 on the transmission and reception unit 3.

FIG. 3 shows a second sectional representation of the radar sensor 100 shown in FIG. 1, with the sectional plane being oriented orthogonally to the pivot axis 6 and extending along the marking III shown in FIG. 1. The arrangement of the drive unit 7 in the interior of the housing body 21 is shown. The drive unit 7 comprises the motor 71 that is preferably configured as a brushless DC motor 71a that can drive the output shaft 73 arranged along the pivot axis 6 via the transmission 72 comprising the toothed belt 72a, the drive gear 72b, and the output gear 72c. The integration of the total drive unit 7 in the interior of the housing body 21 enables a compact and robust construction of the radar sensor 100. The relative arrangement of the drive unit 7 and of the components of the transmitter and receiver 3 (see FIG. 2) is preferably selected such that a mass distribution that is symmetrical as possible results about the pivot axis 6, whereby the radar sensor 100 also has sufficient mechanical stability and precise radar location in the vibration-loaded areas of use.

FIG. 4 shows a third sectional representation of the radar sensor 100 shown in FIG. 1, with the sectional plane being oriented orthogonally to the pivot axis 6 and extending along the marking IV shown in FIG. 1. The connection cable 81 is shown that is configured as a buffer spring from a ribbon cable and that is wound around the pivot axis 6 in the region of the output shaft 73. The buffer spring 81 serves the electrical connection of the components of the radar sensor 100 arranged in the interior of the housing body 21 to external feed lines for the power supply and the exchange of data. The external feed lines connected to the connector part 8 fixed to the frame (see FIG. 1) are conducted into the interior of the housing body along the pivot axis 6 by means of ribbon cables and ensure, in the form of the buffer spring 81, a reliable and interference-free signal transmission independently of the pivot movement of the housing 2.

Figure 5:
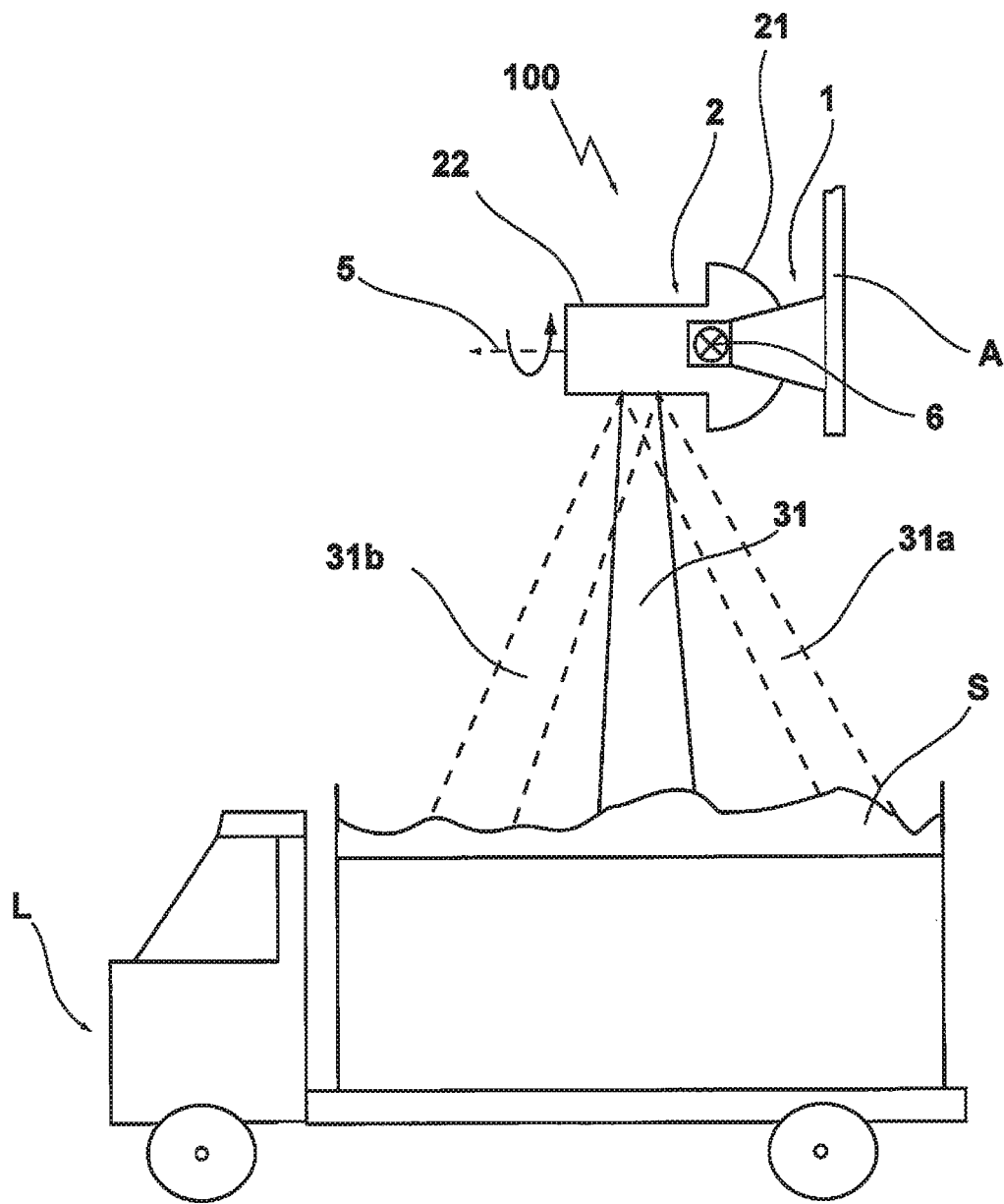
FIG. 5 is a schematic representation of an exemplary use of the radar sensor in accordance with the invention for bulk good detection.

FIG. 5 shows an exemplary use of the radar sensor 100 in accordance with the invention for detecting a bulk good S containing ore on the load surface of a truck L, for instance as part of the departure monitoring of a mining operation. The radar sensor 100 is arranged for this purpose above the truck L with its frame 1 at a mount A so that the primary beam 31 exiting the hood 22 is incident on the bulk good S to be detected. By rotating the primary beam 31 about the axis of rotation 5, the bulk good S is scanned transversely to the direction of travel of the truck and the actuation of the pivot axis 6 in accordance with the invention tilts the primary beam 31 along the direction of travel of the truck L into the positions 31a and 31b so that the total bulk good S transported on the load surface of the truck L can be detected with a high measurement resolution by the radar sensor 100.

The invention is not restricted in its design to the preferred embodiment specified above. A number of variants is rather conceivable that also makes use of the solution shown with generally differently designed embodiments. All the features and/or advantages, including any construction details, spatial arrangements, and method steps, originating from the claims, from the description, or from the drawings can be essential to the invention both per se and in the most varied combinations.

REFERENCE NUMERAL LIST 100 radar sensor
1 frame
11 frame base
12 holder
2 housing
21 housing body
21a-21b housing end face
22 housing hood
3 transmission and reception unit
3a front end
30 radiation direction
31 primary signal
310 high frequency signal
31a-31b primary signal
4 waveguide
5 axis of rotation
6 pivot axis
7 drive unit
71 motor
71a brushless DC motor
72 transmission
71a toothed belt
72b drive gear
72c output gear
73 output shaft
8 connector part
81 connection cable
9 deflection apparatus 91 mirror
91a plastic body
91 metal coating
92 deflection apparatus drive
θ angle between the axis of rotation and the radiation direction
Θ angle between the axis of rotation and the pivot axis
II, III, IV sectional plane marking
A mount
L truck
S bulk good

The invention claimed is:

1. A radar sensor, comprising:
a frame;
a housing rotatably supported by the frame for rotation about a pivot axis with respect to the frame;
a motor, a transmission, and an output shaft disposed within the housing operable to rotate the housing about the pivot axis, the output shaft arranged along the pivot axis, wherein the transmission includes a toothed belt and/or at least one gear;
a mirror disposed within the housing and rotatable about an axis of rotation, the pivot axis being orthogonal with respect to the axis of rotation;
a drive disposed within the housing and arranged about the axis of rotation, the drive being operable to rotate the mirror about the axis of rotation;
a waveguide for radio frequency signals, the waveguide extending through the drive;
a transmitter and receiver disposed within the housing operable to irradiate radio frequency signals that propagate through the waveguide along the axis of rotation;
the mirror configured for deflecting the radio frequency signals from the waveguide in a radiation direction orthogonal to the axis of rotation such that the radio frequency signals reflected outside the radar sensor are deflected onto and received by the transmitter and receiver by the mirror, the radiation direction being rotatable about the axis of rotation by rotation of the mirror about the axis of rotation;
a connector part arranged at the frame for connecting the radar sensor to an external supply line and/or an external data line;
a connection cable for conducting the external supply line and/or the external data line from the connector part arranged at the frame into an interior of the housing, wherein the connection cable is arranged along the pivot axis when transitioning from the frame into the interior of the housing.

2. The radar sensor of claim 1, wherein the housing is rotatable by the motor, the transmission, and the output shaft at an angular angle of ±70° about the pivot axis.

3. The radar sensor of claim 1, wherein the motor is a brushless DC motor.

4. The radar sensor of claim 1, wherein the connection cable is configured as a buffer spring wound about the pivot axis in the interior of the housing.

5. The radar sensor of claim 1, wherein the housing has a first end face and a second end face, the pivot axis extends orthogonally through the first end face and the second end face, and the housing is rotatably supported about the pivot axis by the first end face and the second end face.

6. The radar sensor of claim 1, wherein the mirror has a plastic body and a reflective metal coating manufactured by additive production.

7. The radar sensor of claim 1, wherein the drive is arranged between the mirror and the transmitter and receiver.

\* \* \* \* \*